United States Patent [19]

Bialke

[11] Patent Number: 5,620,060

[45] Date of Patent: Apr. 15, 1997

[54] LUBRICANT REPLENISHMENT SYSTEM

[75] Inventor: William E. Bialke, Ithaca, N.Y.

[73] Assignee: Ithaco, Inc., Ithaca, N.Y.

[21] Appl. No.: 597,614

[22] Filed: Feb. 6, 1996

[51] Int. Cl.$^6$ ................................................ F01M 5/00
[52] U.S. Cl. ...................... 184/104.1; 184/6.22; 184/7.4
[58] Field of Search ............................... 184/104.1, 6.22, 184/7.4

[56] References Cited

U.S. PATENT DOCUMENTS

| Re. 34,391 | 9/1993 | Blake . | |
|---|---|---|---|
| 1,408,181 | 2/1922 | Dutro . | |
| 1,735,266 | 11/1929 | Dutro . | |
| 2,007,482 | 7/1935 | Stitt . | |
| 2,036,808 | 4/1936 | House . | |
| 3,650,505 | 3/1972 | Drexel . | |
| 3,743,871 | 7/1973 | Church | 384/404 |
| 3,938,868 | 2/1976 | Van Wyk | 384/278 |
| 4,019,785 | 4/1977 | Stinson et al. | 184/6.21 |
| 4,149,835 | 4/1979 | Wells | 418/53 |
| 4,674,398 | 6/1987 | Taylor . | |
| 4,738,336 | 4/1988 | Smith et al. . | |
| 5,174,497 | 12/1992 | White . | |
| 5,251,871 | 10/1993 | Suzuki . | |
| 5,303,800 | 4/1994 | Persson . | |
| 5,423,399 | 6/1995 | Smith et al. . | |

Primary Examiner—Thomas E. Denion
Attorney, Agent, or Firm—Harris Beach & Wilcox, LLP

[57] ABSTRACT

The present invention is a system for replenishing an article of equipment with a supply of lubricant. A housing is provided which defines a reservoir. The housing includes an open end connected to the equipment article such that the reservoir and the equipment article are in fluid communication. Lubricant is disposed in the reservoir and a check valve is secured at the open end of the housing to allow one-way flow of lubricant from the reservoir to the housing. Heating the lubricant to a predetermined temperature results in a precisely ascertainable mass of lubricant being forced from the reservoir to the equipment article.

20 Claims, 4 Drawing Sheets

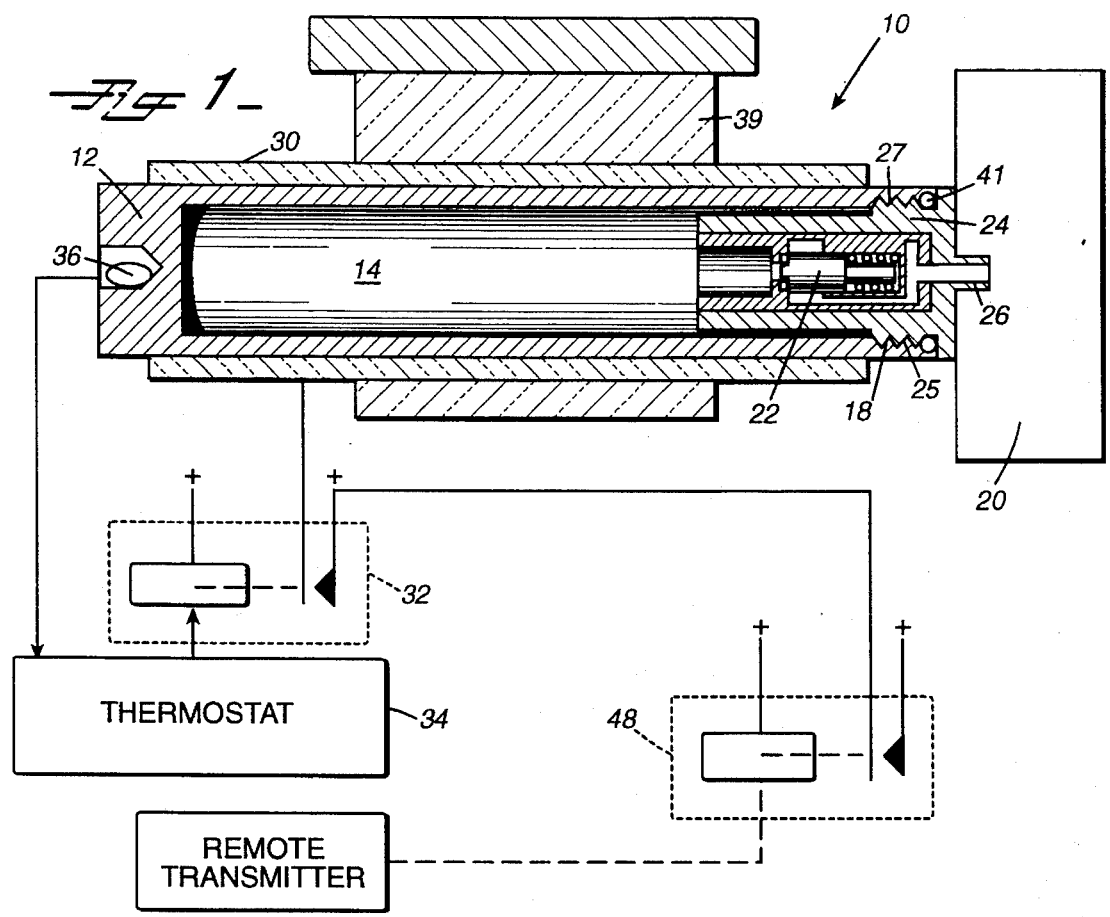
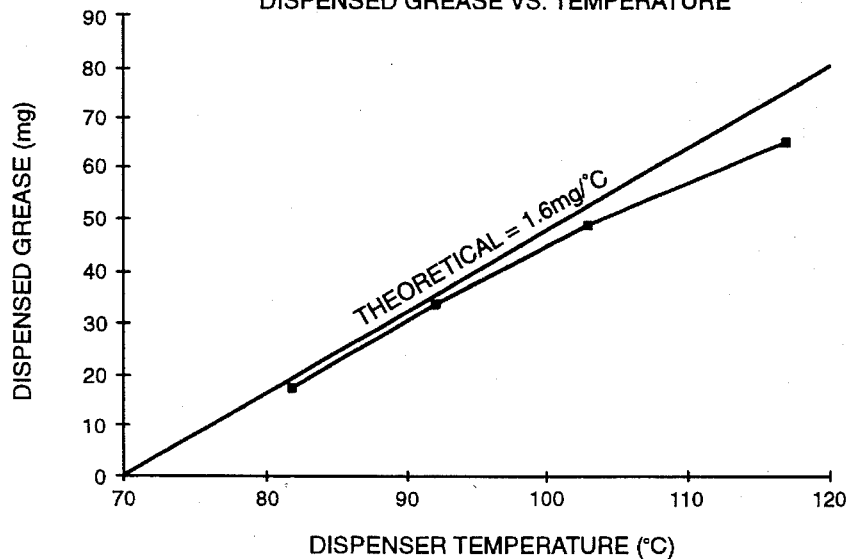

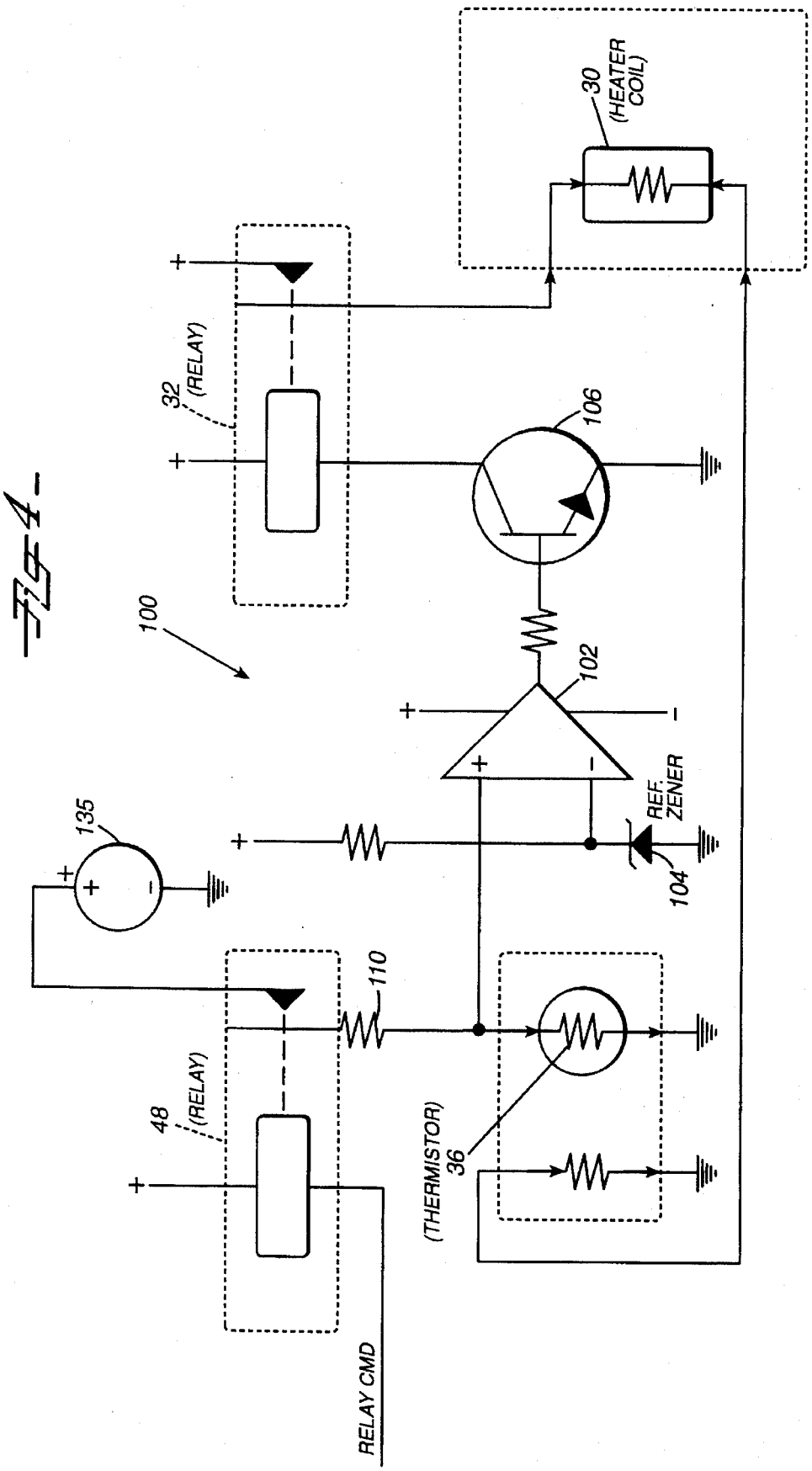

LUBRICANT REPLENISHMENT SYSTEM

BACKGROUND OF THE INVENTION

1. Field of the Invention

The present invention relates to a system for supplying a lubricant to an equipment article, and more particularly to a selectively operable system for replenishing an equipment article with a supply of lubricant.

2. Description of Background

Systems are known for supplying a lubricant to a wheel bearing assembly or another equipment article. Prior art systems of a well known design maintain a constant level of lubricant in an article of equipment by providing a spring-loaded or other pressure-responsive components that constantly force lubricant into the equipment article.

U.S. Pat. No. 5,303,800 issued to Persson describes a system including a lubricant-holding reservoir attached to a wheel hub. The reservoir is in fluid communication with the hub, and includes a bellows that is responsive to pressure changes within the hub. The bellows serves as a movable wall for containing lubricant within the reservoir. Pressure-responsive movement of the bellows maintains a constant lubricant level in the wheel hub.

Several references, including U.S. Pat. No. 4,941,595 issued to Blake, U.S. Pat. No. 4,106,816 issued to Prokop, and U.S. Pat. No. 4,106,816 issued to August describe lubricant-supplying systems including a grease chamber disposed within a cylindrical housing, a spring-loaded plate slidably mounted in the housing, and a grease fitting provided in the housing for charging the housing with grease and forcing the spring-loaded plate outwardly. The spring-loaded plate continually exerts pressure against the grease and causes the grease to enter the wheel bearing housing and coat the wheel bearings.

Pressure-responsive systems of the type described above exhibit various disadvantages and limitations. Systems of the type described are designed to constantly supply lubricant to an equipment article requiring lubrication and are not easily adapted for selective release of lubricant into an equipment article. If systems of this type are modified for selective replenishing, then the mass of lubricant released is not easily controlled. Further, the rate of lubricant flow in these systems is not easily controlled. Still further, many of these systems require rather sophisticated mechanical components which are susceptible to breakdown.

Lubricant replenishing systems are often implemented in spacecraft applications. Bearing lifetime in a spacecraft spin bearing is limited by the lubricant supply. The bearings operate under very little stress, and as long as lubricant is present, their lifetimes are essentially infinite. The initial charge of lubricant will eventually be depleted due to evaporation in vacuum, and surface migration. It is presently accepted that a grease lubrication system will provide ample lubricant to a spin bearing system for a minimum of 8 years. If the lubricant were replenished during the mission, the lifetime of the mechanism could theoretically be doubled, extending the mission life to 16 years.

On-orbit relubrication of space flight mechanisms has been a long-standing problem. Others have solved the problem, but either in a complex manner resulting in questionable reliability or at a high cost. The existing solutions are generally limited to the replenishment of oil, whereas a grease replenishment system would be preferred.

There exists a need for a low cost lubricant replenishing system which can be adapted to selectively and remotely replenish an equipment article with a supply of a lubricant, and which releases lubricant into the equipment article at a rate that is easily controlled.

SUMMARY OF THE INVENTION

According to its major aspects and broadly stated, the present invention is a system for replenishing an equipment article with a supply of lubricant.

The system includes a housing which defines a reservoir. A first end of the reservoir is closed while a second end of the reservoir is open and in fluid communication with an equipment article to which the system supplies lubrication. A supply of lubricant is placed in the reservoir, and a check valve is disposed at the open end of the reservoir which allows one-way flow of lubricant out of the reservoir and into the equipment article. The reservoir is typically cylindrical or annular.

Flow of lubricant out of the reservoir is provided through application of heat to the lubricant. The lubricant used will have a much higher coefficient of thermal expansion than the material of the housing. Therefore, heating of the lubricant will cause the volume of the lubricant to expand relative to the reservoir volume, and a precisely ascertainable amount of lubricant will be forced out of the housing when the lubricant is heated, provided the lubricant is conditioned appropriately. Heating of the lubricant may be accomplished with use of a thermofoil heater disposed about the periphery of the housing.

The mass of lubricant that is displaced from the reservoir into the equipment article is precisely adjusted by adjusting the temperature of the lubricant. Preferably, the system is conditioned so that the lubricant does not expand to a volume larger than that of the reservoir when at a temperature within normal operating temperatures of the equipment article.

In one embodiment of the invention, the heater is a single state heater which upon actuation heats the lubricant to a predetermined temperature. When the lubricant reaches the predetermined temperature, the lubricant has a volume which is greater than that of the reservoir by a precisely ascertainable amount. Perhaps because operation of the lubricant replenishment system does not depend on the functioning of a sophisticated mechanical component such as a bellows of a spring, a precisely ascertainable quantity of the lubricant will be displaced out of the housing and into the equipment article when the housing is heated to the predetermined temperature.

In another embodiment of the invention, the heater is a multi-state heater switchable between several states, each state having a discrete temperature. At each temperature state the lubricant expands to an ascertainable volume corresponding to that temperature state. In this embodiment, a desired quantity of lubricant can be forced into an equipment article by selecting a heater state having a temperature corresponding to the desired lubricant volume. A higher-temperature operating state can be actuated after actuation of a lower-temperature operating state, In another variation of the invention, which can be implemented by any of the above embodiments, the heater temperature is made variable in a range of temperatures. The volume of lubricant forced into an equipment article can be varied by varying the heater temperature.

In another embodiment, the heater of the housing is made to heat the lubricant of the housing at a controlled rate. The rate at which lubricant flows into the equipment article is controlled by controlling the rate of heating.

While the invention will find general use as a system for replenishing equipment articles with a lubricant, the system is particularly well suited for remote maintenance of lubrication in inaccessible equipment articles. In one particular embodiment the system is implemented to replenish lubricant in a spacecraft spin bearing.

The system is made remotely operable by providing a circuit wherein closing of relay contact activated the housing heater of the invention in a selected operating state. The relay may be energized upon application of a control signal which is generated by radio transmission or other conventional remote transmission methods.

The features described above, and other features and advantages of the present invention will be become apparent to persons skilled in the art of the present invention from a close reading of the ensuing Detailed Description of the Preferred Embodiments in connection with the referenced Drawings.

BRIEF DESCRIPTION OF THE DRAWINGS

In the Drawings,

FIG. 1 illustrates a lubricant replenishment system according to the invention having a cylindrical lubricant-containing housing;

FIG. 2b is a cross-sectional top view of an annular housing according to the invention taken along lines 2b—2b of FIG. 2a.

FIG. 3 is a plot showing dependence of released lubricant on thermostat control temperature for one embodiment of the invention;

FIG. 4 is a control circuit for a single state heater according to the invention;

DETAILED DESCRIPTION OF THE PREFERRED EMBODIMENTS

Figure 2A:
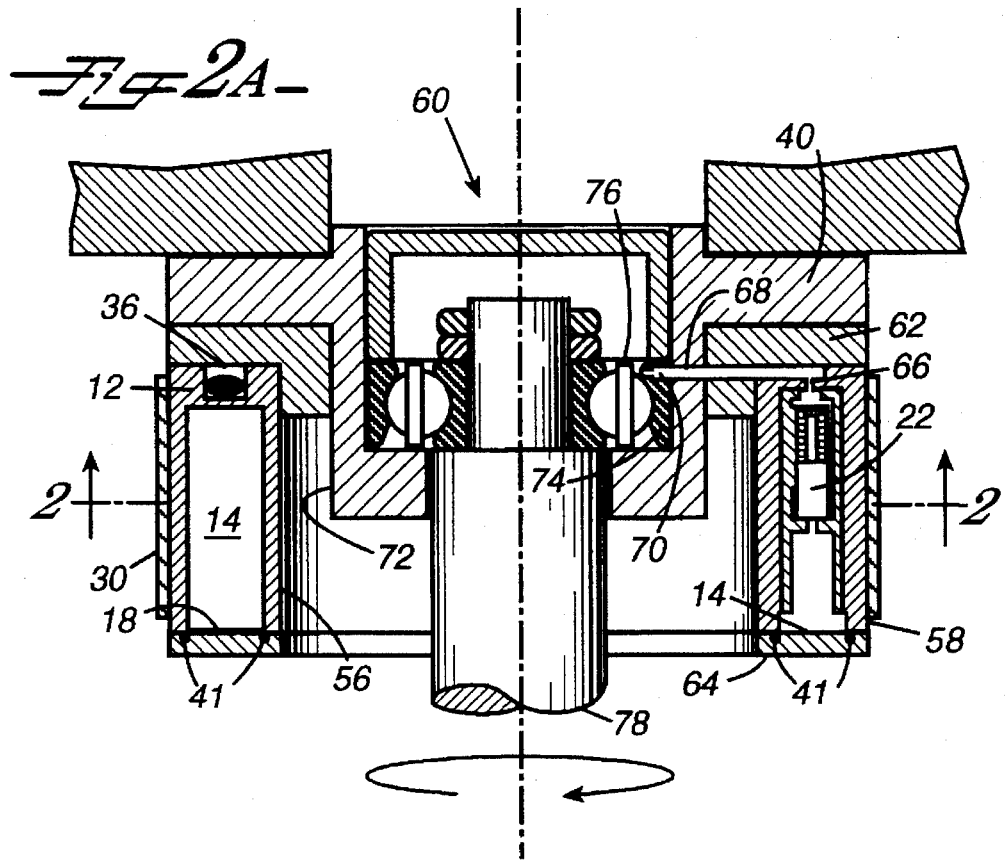
FIG. 2a shows cross-sectional side view of an annular lubricant-containing housing of a system according to the invention.

General features of a lubricant replenishing system according to the invention are described with reference to FIG. 1. System 10 includes housing 12 which defines reservoir 14. Housing 12 includes an open end 18 which is in fluid communication with equipment article 20. Lubricant is disposed in reservoir 14, and check valve 22 is secured at open end 18 of housing 12 to allow one-way flow of lubricant out of reservoir 14 and into equipment article 20. The lubricant disposed in reservoir may be, for example any oil, or a semi-solid grease, such as Rheolube 2000, available from Nye Oil Company of New Bedford, Mass.

Housing 12 may be constructed of virtually any rigid material having a coefficient of thermal expansion less than that of the lubricant. A most preferred material for the housing is aluminum. Aluminum has a high thermal conductivity and is lightweight.

Check valve 22 may be installed at open end 18 of housing 12 by first installing a fitting 24 at open end 18 of housing 12, which in the embodiment of FIG. 1 is provided by an aluminum cylinder. Fitting 24 is adapted to carry check valve 22 and includes an orifice 26 for allowing fluid communication between check valve 22 and equipment article 20. Fitting 24 is secured to housing 12 in a seal tight fashion. In a preferred embodiment, an o-ring 41 is interposed between fitting 24 and housing 12 and fitting 24 is removably secured to housing 12 with use of complementary threads, 25 and 27 to allow re-filling of reservoir 14.

Check valve may be a model CSFA187 of the type manufactured by The Lee Company of Westbrook, Conn. In general, the check valve must be able to maintain an air tight seal in the direction against the desired lubricant flow, and must be able to open to allow flow of lubricant at the internal pressure generated by the thermal expansion of the lubricants.

While the system shown in FIG. 1 is shown as having a cylindrical reservoir, the housing of the system can assume virtually any configuration, for example, the housing can include an inner cylinder which defines, with the walls of the housing, an annular reservoir.

Figure 2B:
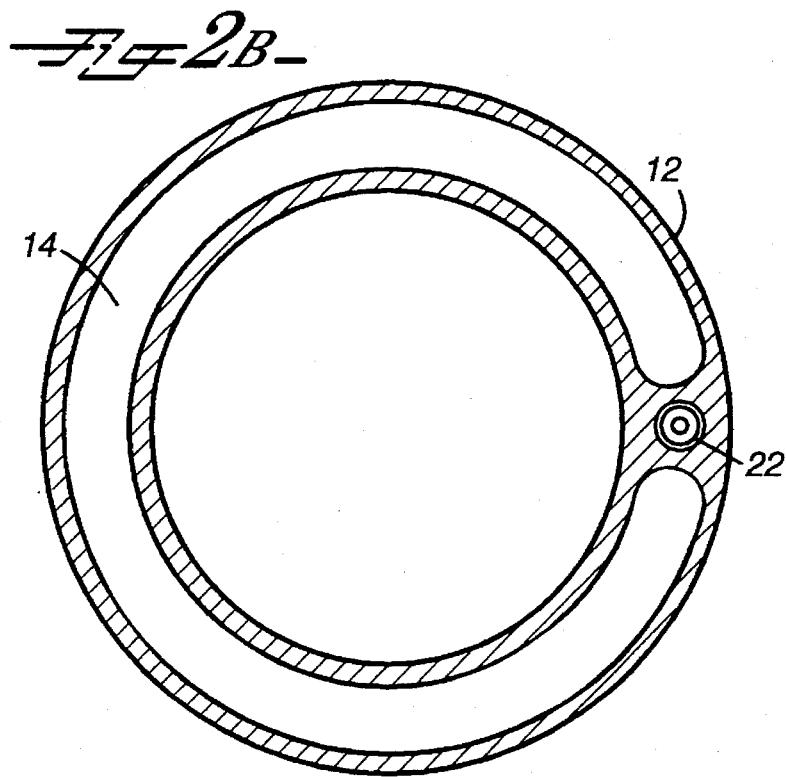

A system having an annular reservoir is shown in FIGS. 2a and 2b. Annular reservoir 14 is defined by housing 12 having an inner cylinder 56 and an outer cylinder 58. Configured as such, housing 12 can be disposed about a cylindrical member to supply lubricant to a spin bearing assembly 60. For spin bearing applications, the embodiment of FIG. 2a is more space efficient than the embodiment of FIG. 1. When housing 12 is installed on spin bearing assembly 60, ring spacer 62 made of a low thermal conductivity material such as fiber glass epoxy, is interposed between bearing assembly 60 and housing 12 so that very little heat from spin bearing assembly 60 is transferred to housing 12. To allow re-filling of reservoir 14 a removable ring cap 64 is provided, which is sealed to housing 12 with use of o-rings 41.

It is seen from FIG. 2a that check valve 22 is installed in one radial position coextensive with walls of annular housing 12, and provides fluid communication between reservoir 14 and open point 66 of housing 12. Meanwhile, an orifice 68 providing fluid communication between reservoir 14 and spin bearing assembly 60 is defined by housing 12, spacer 62 and bearing orifice 70, which extends radially through a wall of bearing assembly housing 72 and through an outer race 74 of assembly 60.

In thermal communication with housing 12 is a heating unit 30 for heating up the lubricant housed within housing 12. Shown in FIG. 1, heating unit 30 may be provided by any resistive element heater. Most preferably, heating unit is provided by thermofoil heater 30 available from Minco Products of Minneapolis Minn. Therefore heater 30 may be wrapped about the outer periphery of housing 12, shown in FIG. 1 as an aluminum cylinder. A heat shrinkable film strip with adhesive on the ends, as available from Minco, can be used to install the thermofoil heater. Importantly, heating unit 30 should be formed substantially along the entire length of housing so that the lubricant is heated up uniformly throughout the reservoir. Thereby, the displacement of a precisely ascertainable mass of lubricant is encouraged.

Heating unit 30 is controlled by a relay contact 32 which is driven by thermostat circuit 34. The system is energized by activating a separate power relay 48. A thermistor 36 in thermal contact with housing 12 generates an output signal for input into thermostat circuit 34. Thermostat circuit 34 closes relay contact 32 when the temperature determined by thermistor 36 is below a predetermined control temperature, and opens relay contact 32 when the temperature of thermistor 36 is above the predetermined control temperature.

Mounting block 39 made of a material having high thermal impedance, such as fiberglass, allows mounting of housing 12 to article 20 or another object.

When reservoir 14 is filled with a lubricant at room temperature, the system must be conditioned for operation. For conditioning the system, the lubricant is heated to a predetermined conditioning temperature above the highest expected operating temperature. When the lubricant is heated to a conditioning temperature above (typically at least about 10° C. above) the highest expected operating temperature, excess lubricant is expelled through the orifice 26 until the reservoir 14 is completely filled with lubricant at the conditioning temperature. Both housing 12 and the lubricant undergo thermal expansion upon application of heat. However, the coefficient of thermal expansion of the lubricant is much greater than that of the housing. Thus, the volume of lubricant will increase relative to that of the housing upon application of heat. Conditioning the system so that the lubricant volume is equivalent to the reservoir volume at a temperature above the highest operating temperature of equipment article 20 ensures that the lubricant volume will not become greater than the volume of reservoir 14 during operation of equipment article 20.

Since the volume of lubricant will normally be equal to the reservoir volume at the conditioning temperature, the reservoir will be under vacuum at operating temperatures as lubricant volume will be less than reservoir volume during operation.

Lubricant is forced out of reservoir 14 when the volume of the lubricant becomes larger than the reservoir volume. When the volume of lubricant exceeds that of the reservoir, the cracking point of check valve 22 is exceeded, and lubricant flows through check valve 22, through orifice 26 and into equipment article 20. The inventors discovered that the mass of lubricant that flows from reservoir 14 to article 20 is precisely related to the lubricant temperature for lubricant temperatures above the conditioning temperature.

EXAMPLE 1

A system according to the invention is provided wherein a cylindrical aluminum housing having a coefficient of thermal expansion (CTE) of about 23 ppm/°C. defines a cylinder reservoir having a volume of about 3 cc. A thermofoil heater is disposed about the housing for heating Rheolube 2000 lubricant having a CTE of about 230 ppm/°C. and a density of about 0.85 g/cc disposed in the reservoir. The lubricant is heated to a conditioning temperature above expected operating temperatures, and the reservoir is completely filled at the conditioning temperature. Lubricant temperature is then increased to a predetermined temperature, and the mass of lubricant forced from the reservoir is collected in a tube of known mass. The mass of the tube is measured to determine the mass of the expelled lubricant. The experiment is continued for several predetermined temperatures above the conditioning temperature. The results of such an experiment are presented in FIG. 3.

It is seen generally that for the present system, the mass of lubricant released is precisely related to the lubricant temperature, and that the mass of lubricant released varies with temperature in a predictable manner. Thus, it will be recognized that the amount of lubricant released from a reservoir according to the invention can be precisely adjusted by adjusting the temperature of the lubricant.

The above-presented data were analyzed and the following relationship was developed for $L_{out}$, the mass of lubricant forced out of reservoir, as a function of several parameters:

$$L_{out} = 3(\alpha_l - \alpha_h)\rho V_h(T_a - T_c) \qquad \text{Eq. 1}$$

where $V_h$ is the volume of the housing, $\rho$ is the density of the lubricant, $\alpha_h$ is the thermal expansion coefficient of the housing, $\alpha_l$ is the thermal expansion coefficient of the lubricant, $T_c$ is the conditioning temperature, and $T_a$ is the activation temperature.

In one embodiment of the invention, heating unit 30 is a single state heater which upon actuation heats the lubricant to a predetermined temperature. When the lubricant reaches the predetermined temperature, the lubricant has a predetermined volume which is greater than the volume of the reservoir. Therefore, an ascertainable quantity of the lubricant will be displaced out of the housing and into the equipment article. A thermostat control circuit for a single state heating unit is shown in FIG. 4. Control circuit 100 may include an operational amplifier 102 serving as a comparator for comparing a variable voltage to a reference voltage, a diode 104 for providing the reference voltage, and a transistor amplifier 106 for amplifying the output of the comparator to ensure energizing or relay 32 when the variable voltage exceeds the reference voltage. It is seen that the size of control resistor 110 determines the voltage drop across thermistor 36 required to cause the voltage drop to exceed the reference voltage, and therefore determines the thermostat control temperature.

In another embodiment of the invention, the heater is a multi-state heater switchable between several states, each state having a discrete control temperature. At each temperature state, the lubricant expands to an ascertainable volume corresponding to the control temperature of that state. In this embodiment, a desired quantity of lubricant can be forced into an equipment article by selecting a heater state having a temperature corresponding to the desired lubricant volume.

Figure 5:
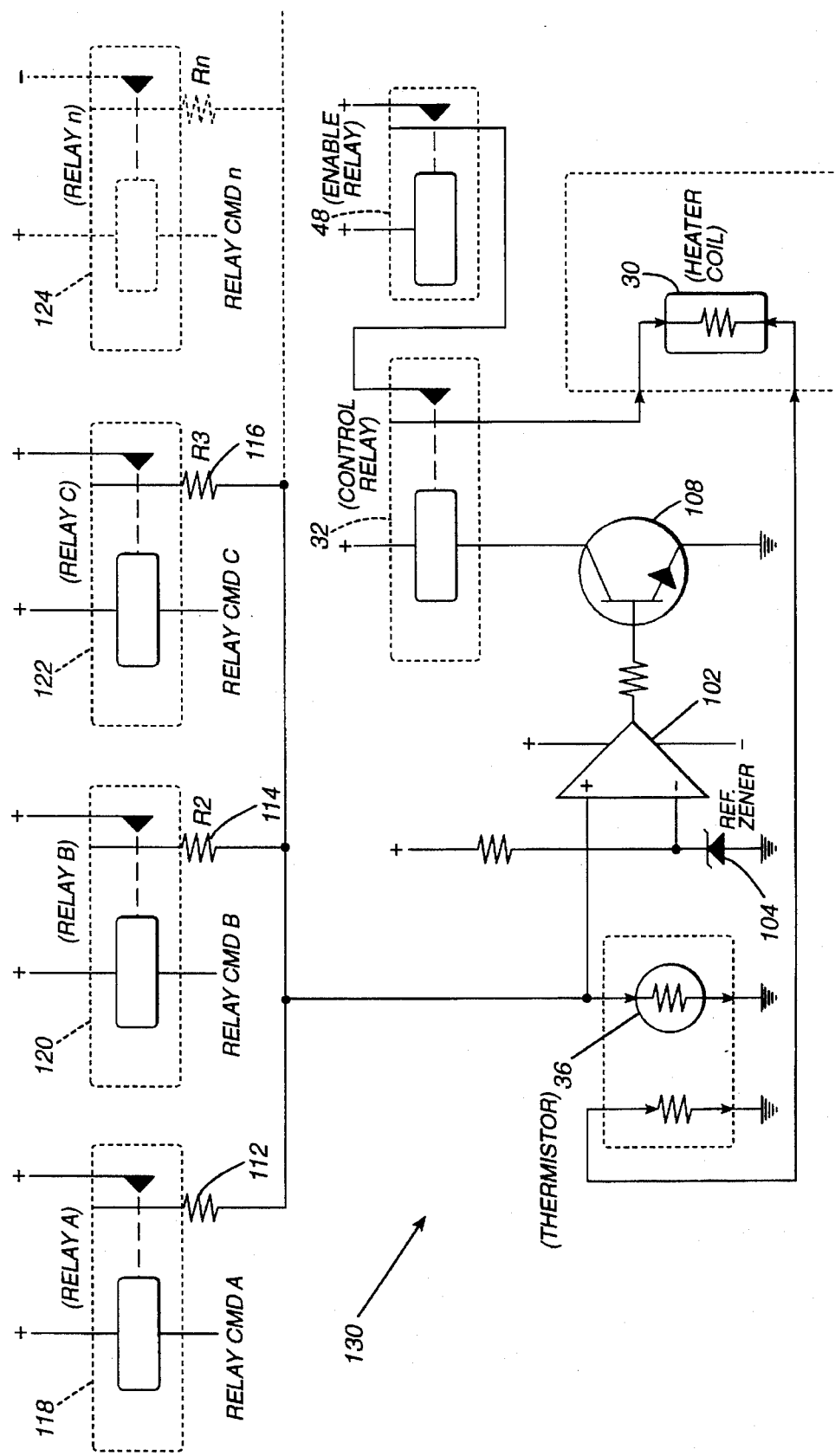
FIG. 5 is a control circuit for a multi-state heater according to the invention.

A thermostat control circuit for a multi-state heater is shown in FIG. 5. It is seen that control resistor 110 of FIG. 4 determining the thermostat set temperature is replaced by a plurality of parallel resistors 112, 114, 116, each of which may be activated by a separate control relay 118, 120, 122. An undetermined number of resistor-controlling control relays may be provided, as indicated by dashed-in relay 124. The effective resistance of parallel resistors 112, 114, 116 is determined by the resistance and the ratings of the parallel resistors that are activated. Therefore, it will be recognized that the thermostat control temperature of control circuit 130 shown in FIG. 5 can be adjusted between a plurality of discrete temperatures through selective operation of control relays 118, 120, 122.

A multi-state heater embodiment of the invention can be operated on a single-shot basis or on a multi-shot basis. For single-shot operation, the system delivers to an equipment article "one shot" of replenishing lubricant to the equipment article requiring lubrication during the lifetime of the system. But unlike the case of a single state heater, the mass of lubricant delivered to an equipment article is selectable between a plurality of discrete masses, each mass corresponding to the predetermined control temperature of the a selected thermostat control relay 118, 120, or 122, or to a thermostat temperature corresponding to the condition that more than one control relays 118, 120, 122 are energized.

For multi-shot operation, a first shot of lubricant is delivered to an equipment article, and then, at some undetermined time thereafter, a subsequent shot of lubricant is delivered to the article by activating a control relay such as 118, 120 or 122 to achieve a thermostat control temperature above the thermostat temperature controlling deliverance of the first shot. Additional subsequent shots can be made by providing additional thermostat control subcircuits having control relays for realizing thermostat temperatures above that controlling deliverance of the previous shot.

A multi-shot operated system can be made so that an equal mass of lubricant is delivered during each shot. The mass of lubricant, $M_s$ delivered during a given shot is given by:

$$M_s = 3(\alpha_l - \alpha_h)\rho V_h (T_s - T_{s-1}) \qquad \text{Eq. 2}$$

where $T_s$, is the current temperature, $T_{s-1}$ is the temperature during the previous shot, $d_l$ is the thermal expansion coefficient of the lubricant, $\alpha_h$ is the thermal housing, $\rho$ is the density of the lubricant, and $V_h$ is the volume of this housing. For the first shot, $T_{s-1}$ is equal to $T_c$, the conditioning temperature. Therefore, the mass of lubricant delivered during a subsequent shot can be made equal to the mass of lubricant delivered during a previous shot by coordination of the present temperature and the previous thermostat control temperature. Specifically, using equal jumps in temperature will result in approximately equal masses of lubricant delivered. Minor variations will occur due to the temperature dependence of thermal expansion coefficients, which has been neglected in Equations 1 and 2.

In another embodiment, the heater temperature is made variable in a range of temperatures. The volume of lubricant forced into an equipment article can be varied by varying the heater temperature with reference to FIG. 4, a thermostat control circuit having a variable thermostat control temperature can be realized by providing a variable voltage source 135.

In another variation of the invention, which can be implemented in any on the described embodiments, the heater of the housing is made to heat the housing for a variable amount of time. The amount of lubricant which flows into the equipment article is made variable by varying the duration of heat application to the housing. If the thermal time constant of the lubricant is known for various operating temperatures, the amount of lubricant which is dispensed can be predicted based on the ambient temperature of the equipment and the amount of time which heat is applied, either manually or with a timer circuit. Progressively longer heat activation times could result in multiple lubricant shots. Additional factors such as lubricant viscosity, voltage applied to the heater and remaining lubricant quantity will affect the amount of lubricant dispensed, and thus must be characterized for an accurate prediction.

While the invention will find general use as a system for replenishing equipment articles with a lubricant, the system is particularly well suited for remote maintenance of lubrication in inaccessible equipment articles. In one particular embodiment the system is implemented to replenish lubricant in a spacecraft spin bearing.

A detailed description of an implementation of the present invention in a spacecraft spin bearing is made with reference to FIG. 2. Orifice 68 is extended to deliver lubricant directly onto the retainer riding land of bearing outer race 74. The rotation of retainer 76 then distributes the lubricant within bearing assembly 60 as shaft 78 revolves.

The system is made remotely operable by providing a circuit wherein closing of a thermostat relay contact activates a thermostat circuit (or one thermostat subcircuit of a plurality of such circuits in a multi-state system) controlling the heater unit. The relay may be energized upon application of a control signal transmitted by radio transmission or by another conventional remote transmission method.

While the invention has been described with reference to specific embodiment, it is understood that many obvious substitutions and changes to these specific embodiments can be made. Therefore, it is stressed that the present invention is to be limited only by the scope of the following claims.

What is claimed is:

1. A system for providing an equipment article with a supply of lubricant, said article adapted for operating in an operating range of temperatures, said system comprising:

a housing defining a reservoir, said reservoir having a reservoir volume, said housing having an open end;

a lubricant disposed in said reservoir, said lubricant having an operating volume no larger than said reservoir volume when said lubricant is in said operating range of temperatures;

valve means disposed at said open end of said housing and in fluid communication with said equipment article, said valve means allowing one-way movement of lubricant out of said housing;

heating means in thermal contact with said housing for heating said lubricant, said heating means expanding the volume of said lubricant to a volume larger than said reservoir volume so that a percentage of said lubricant is forced out of said reservoir and into said equipment article upon activation of said heating means; and selective activation means in communication with said heating means for selectively activating said heating means.

2. The system according to claim 1, wherein said heating means heats said lubricant to a first predetermined temperature at which said lubricant has a first predetermined volume, so that a precisely ascertainable mass of lubricant is forced out of said reservoir when said heating means heats said lubricant to said first predetermined temperature.

3. The system according to claim 1, wherein said heating means is adapted to selectively heat said lubricant to a selectable one temperature out of a plurality of discrete predetermined temperatures, said lubricant having a discrete volume corresponding to each of said predetermined temperatures, so that a desired mass of lubricant is forced out of said reservoir upon selection of a temperature corresponding to said desired mass.

4. The system according to claim 1, wherein said heating means is adapted to heat said lubricant, at a given time, to one temperature out of a plurality of discrete predetermined temperatures, said predetermined temperatures being separated by equal temperature increments and activated sequentially upon each activation of said heating means so that a substantially equal mass of said lubricant is forced out of said reservoir upon each activation of said heating means.

5. The system according to claim 1, wherein said heating means is a variable heating means adapted to heat said lubricant to a desired temperature in a range of temperatures, so that a desired volume of lubricant is forced out of said reservoir by adjusting said heating means to said desired temperature.

6. The system according to claim 1, wherein said heating means includes a timed control means for varying the time for which said lubricant is heated, so that the amount of flow of said lubricant flowing out of said reservoir may be varied.

7. The system of claim 1, wherein said heating means is a thermofoil heater.

8. The system of claim 1, wherein said heating means is a thermofoil heater wrapped around said housing substantially along the length thereof to assure uniform heating of said lubricant.

9. The system of claim 1, wherein said valve means is a check valve.

10. A system for providing a spin bearing assembly with a supply of lubricant, said bearing assembly being adapted for operating in an operating range of temperatures, said system comprising:

a spin bearing assembly having a bearing orifice;

an annular housing disposed about said spin bearing assembly, said housing defining a reservoir, said reservoir having a reservoir volume, said housing having an opening;

a lubricant disposed in said reservoir, said lubricant having an operating volume no larger than said reservoir volume when said lubricant is in said operating range of temperatures;

a valve means disposed in said housing to provide fluid communication between said reservoir and said opening, said valve means allowing one-way movement of lubricant out of said housing;

means providing fluid communication between said opening and said bearing orifice; and heating means in thermal contact with said housing for heating said lubricant, said heating means expanding the volume of said lubricant to a volume larger than said reservoir volume so that a percentage of said lubricant is forced out of said reservoir and into said bearing assembly upon activation of said heating means.

11. The system of claim 10, further comprising an insulated ring spacer interposed between said bearing assembly and said housing.

12. The system according to claim 10, wherein said heating means heats said lubricant to a first predetermined temperature at which said lubricant has a first predetermined volume, so that a precisely ascertainable mass of lubricant is forced out of said reservoir when said heating means heats said lubricant to said first predetermined temperature.

13. The system according to claim 10, wherein said heating means is adapted to selectively heat said lubricant to a selectable one temperature out of a plurality of discrete predetermined temperatures, said lubricant having a discrete volume corresponding to each of said predetermined temperatures, so that a desired mass of lubricant is forced out of said reservoir upon selection of a temperature corresponding to said desired mass.

14. The system according to claim 10, wherein said heating means is adapted to heat said lubricant, at a given time, to one temperature out of a plurality of discrete predetermined temperatures, said predetermined temperatures being separated by equal temperature increments and activated sequentially upon each activation of said heating means so that a substantially equal mass of said lubricant is forced out of said reservoir upon each activation of said heating means.

15. The system according to claim 10, wherein said heating means is a variable heating means adapted to heat said lubricant to a desired temperature in a range of temperatures, so that a desired volume of lubricant is forced out of said reservoir by adjusting said heating means to said desired temperature.

16. The system according to claim 10, wherein said heating means includes a timed control means for varying the time for which said lubricant is heated, so that the amount of flow of said lubricant flowing out of said reservoir may be varied.

17. The system of claim 10, wherein said heating means is a thermofoil heater.

18. The system of claim 10, wherein said heating means is a thermofoil heater wrapped around said housing substantially along the length thereof to assure uniform heating of said lubricant.

19. The system of claim 10, wherein said valve means is a check valve.

20. The system of claim 10 wherein said bearing assembly includes an outer race, and wherein said bearing orifice extends to said outer race so that lubricant is distributed directly to said outer race.

* * * * *